(12) United States Patent
Tsujita (10) Patent No.: US 10,124,632 B2
(45) Date of Patent: Nov. 13, 2018

(54) TIRE CONDITION DETECTING APPARATUS AND TIRE CONDITION MONITORING APPARATUS

(71) Applicant: PACIFIC INDUSTRIAL CO., LTD., Ogaki-shi (JP)

(72) Inventor: Yasuhisa Tsujita, Motosu (JP)

(73) Assignee: PACIFIC INDUSTRIAL CO., LTD., Ogaki-Shi, Gifu-Ken (JP)

( * ) Notice: Subject to any disclaimer, the term of this patent is extended or adjusted under 35 U.S.C. 154(b) by 211 days.

(21) Appl. No.: 15/023,863

(22) PCT Filed: Jun. 26, 2015

(86) PCT No.: PCT/JP2015/068477
§ 371 (c)(1),
(2) Date: Mar. 22, 2016

(87) PCT Pub. No.: WO2016/208056
PCT Pub. Date: Dec. 29, 2016

(65) Prior Publication Data
US 2017/0151840 A1    Jun. 1, 2017

(51) Int. Cl.
*B60C 23/00* (2006.01)
*B60C 23/04* (2006.01)

(52) U.S. Cl.
CPC ...... *B60C 23/0416* (2013.01); *B60C 23/0476* (2013.01); *B60C 23/0483* (2013.01); *B60C 23/0488* (2013.01)

(58) Field of Classification Search
CPC ........ B60C 23/0408–23/0416; B60C 23/0435; B60C 23/0437; B60C 23/0486; B60C 23/0488; B60C 23/0483; B60C 23/0476
(Continued)

(56) References Cited

U.S. PATENT DOCUMENTS 8,498,759 B1 *   7/2013   Juzswik ............. B60C 23/0416
                                                      701/10
2006/0250228 A1   11/2006   Mori et al.
(Continued)

FOREIGN PATENT DOCUMENTS

CN         1975796 A     11/2005
CN      101505979 A      5/2006
(Continued)

OTHER PUBLICATIONS

International Search Report, PCT/JP2015/068477, dated Aug. 11, 2015, pp. 1-2.
(Continued)

*Primary Examiner* — Thomas Mullen
(74) *Attorney, Agent, or Firm* — Cantor Colburn LLP (57) ABSTRACT

A tire condition detecting apparatus includes a condition detecting section, a transmission section, and a transmission-side control section. The transmission section is configured to transmit a signal that contains information related to the condition of the tire to a receiver, which includes a reception-side control section. The reception-side control section identifies the position of the wheel assembly in which the tire condition detecting apparatus is provided based on the received signal strength indication (RSSI) of the signal. The transmission-side control section is configured to cause a position detecting signal and an instruction signal to be transmitted from the transmission section to the receiver. The position detecting signal is configured to cause the reception-side control section to identify the position of the tire condition detecting apparatus. The instruction signal is transmitted before the position detecting signal is transmitted and instructs the reception-side control section to start obtaining the RSSI.

5 Claims, 7 Drawing Sheets

(58) Field of Classification Search
USPC ............. 340/442, 447; 73/146.2–146.5
See application file for complete search history.

(56) References Cited

U.S. PATENT DOCUMENTS

| | | | |
|---|---|---|---|
| 2007/0120658 A1 | 5/2007 | Okubo et al. | |
| 2009/0012740 A1* | 1/2009 | Hain | B60C 23/0416 702/148 |
| 2009/0179747 A1 | 7/2009 | Lin et al. | |
| 2011/0313623 A1* | 12/2011 | Greer | G06F 11/30 701/49 |
| 2012/0059551 A1* | 3/2012 | Juzswik | B60C 23/0416 701/49 |
| 2014/0088816 A1 | 3/2014 | Shima et al. | |

FOREIGN PATENT DOCUMENTS

| | | |
|---|---|---|
| JP | 3517616 B2 | 4/2004 |
| JP | 2006312342 A | 11/2006 |
| JP | 2010030449 A | 2/2010 |
| JP | 2012240468 A | 12/2012 |
| JP | 2013086661 A | 5/2013 |
| JP | 2014083884 A | 5/2014 |
| JP | 2014231337 A | 12/2014 |

OTHER PUBLICATIONS

Written Opinion, dated Aug. 11, 2015, pp. 1-3.
Recieved an Office Action dated Mar. 17, 2017, during the prosecution of the corresponding Korean patent application.
Office Action dated Sep. 30, 2017, was-received during the prosecution of the corresponding Chinese patent application 2017092702764560.
The First Office Action from the State Intellectual Property Office of People's Republic of China; Application No. or Publication No. 201580001999.4.
The translation of the International Preliminary Report on Patentability, International Application No. PCT/JP2015/068477, International Filing Date: Jun. 26, 2015; dated Dec. 26, 2017, 5 pgs.

\* cited by examiner

| ID | Air Pressure | RSSI Obtainment Flag | Status | CRC |

Fig.11B

| Stop Obtaining RSSI |

TIRE CONDITION DETECTING APPARATUS AND TIRE CONDITION MONITORING APPARATUS

TECHNICAL FIELD

The present invention relates to a tire condition detecting apparatus and a tire condition monitoring apparatus.

BACKGROUND ART

Conventionally, wireless tire condition monitoring apparatuses have been proposed that permit the driver in the passenger compartment to check the conditions of the tires of a vehicle. One such tire condition monitoring apparatus includes a receiver mounted in a vehicle body and transmitters attached to respective wheel assemblies. Each transmitter detects the condition of the associated tire, that is, pressure and temperature in the tire, and wirelessly transmits a signal containing data that represents the detected tire condition. The receiver receives signals transmitted from the transmitters through a reception antenna, and displays information related to the tire conditions on a display provided in the passenger compartment as necessary.

In such a tire condition monitoring apparatus, the receiver is preferably configured to determine which one of the wheel assemblies a received signal has been transmitted from, in other words, the position of the wheel assembly associated with the received signal.

In the tire condition monitoring apparatus disclosed in Patent Document 1, a transmitter is attached to each of the wheel assemblies of a vehicle. The transmitter includes a pressure sensor configured to detect the air pressure in the tire and a transmission circuit configured to incorporate information related to the tire air pressure detected by the pressure sensor into a signal (radio wave) and transmit the signal. A receiver is provided in the vehicle body. The receiver has a reception antenna, which is arranged at different distances from the respective transmitters. The receiver includes a reception circuit configured to measure the received signal strength indication (RSSI) of the signal and a reception-side control section configured to output the RSSI measured by the reception circuit. Signals transmitted from the transmitters are attenuated before reaching the reception antenna. Thus, the greater the distance from the reception antenna to the transmitter, the weaker the received signal strength indication, or RSSI, of the signal received by the receiver becomes. The reception-side control section identifies the positions of the wheel assemblies based on the magnitude relationship of the differences between the maximum values and the minimum values of the RSSIs of the signals transmitted from the transmitters. For example, the receiver determines that the ascending order of the magnitudes of the difference between the maximum value and the minimum value of the RSSI agrees with the ascending order of the distances between the reception antenna and the respective transmitters that have transmitted the signals. Based on the positional relationship with the transmitters, the receiver determines the positions of the wheel assemblies, each of which has a transmitter.

Also, the reception-side control section obtains the air pressures of the respective tires based on the information related to the tire air pressure contained in the signals transmitted from the transmitters. If there is an abnormality in the air pressure of any of the tires, the reception-side control section notifies the driver of the abnormality.

PRIOR ART DOCUMENT

Patent Document

Patent Document 1: Japanese Laid-Open Patent Publication No. 2013-86661

SUMMARY OF THE INVENTION

Problems that the Invention is to Solve

In the receiver, the reception-side control section obtains the RSSI measured by the reception circuit and the information related to the tire air pressure. The load on the reception-side control section is thus great, and the information related to the tire air pressure may fail to be obtained.

Accordingly, it is an objective of the present invention to provide a tire condition detecting apparatus and a tire condition monitoring apparatus that reduce the load on the reception-side control section.

Means for Solving the Problems

To achieve the foregoing objective and in accordance with one aspect of the present invention, a tire condition detecting apparatus is provided in each of wheel assemblies of a vehicle to detect a condition of a tire. The apparatus includes a condition detecting section, which detects the condition of the tire, a transmission section, and a transmission-side control section. The transmission section is configured to transmit a signal that contains information related to the condition of the tire to a receiver, which includes a reception-side control section. The reception-side control section identifies the position of the wheel assembly in which the tire condition detecting apparatus is provided based on a received signal strength indication (RSSI) of the signal. The transmission-side control section causes the transmission section to transmit the signal. The transmission-side control section is configured to cause a position detecting signal and an instruction signal to be transmitted from the transmission section to the receiver. The position detecting signal is configured to cause the reception-side control section to identify the position of the tire condition detecting apparatus, and the instruction signal is transmitted before the position detecting signal is transmitted and instructs the reception-side control section to start obtaining the RSSI.

With this configuration, the instruction signal, which instructs to start obtainment of the RSSI before the position detecting signal is transmitted from each transmitting section. Thus, by obtaining the RSSI after receiving the instruction signal, the reception-side control section obtains the RSSI of the position detecting signal to identify the positions of the wheel assemblies, in each of which a tire condition detecting apparatus is provided. The reception-side control section does not necessarily obtain the RSSI prior to reception of the instruction signal. Thus, compared to a case in which the RSSI is always obtained, the load on the reception-side control section is reduced. This prevents the obtainment of the information related to the tire condition from being hindered.

The above described tire condition detecting apparatus may be configured such that the instruction signal is a signal that specifies time during which the reception-side control section is causes to obtain the RSSI.

With this configuration, the reception-side control section obtains the RSSI only for a time designated by the instruction signal. Thus, it is not necessary to instruct the reception-side control section to stop obtaining the RSSI.

The above described tire condition detecting apparatus may include an acceleration sensor, which detects acceleration in a direction in which centrifugal force acts as the wheel assembly rotates. The transmission-side control section may vary the time during which the RSSI is obtained in accordance with the acceleration detected by the acceleration sensor.

With this configuration, when the acceleration detected by each acceleration sensor increases, the transmission time of the position detecting signal is shortened. This reduces the power consumption for transmission of the position detecting signal.

The above described tire condition detecting apparatus may be configured such that the transmission-side control section causes a stop signal to be transmitted from the transmission section to the receiver. The stop signal is configured to instruct to stop the obtainment of the RSSI.

With this configuration, the reception-side control section is instructed to stop obtaining the RSSI. That is, the reception-side control section is prevented from continuing to obtain the RSSI.

To achieve the foregoing objective, a tire condition monitoring apparatus is provided that includes any of the above described tire condition detecting apparatus and a receiver, which receives a signal transmitted from the tire condition detecting apparatus to obtain the condition of the tire. The receiver includes a receiving section, which receives the signal transmitted from the tire condition detecting apparatus, a measuring section, which measures a received signal strength indication (RSSI) of the received signal, and a reception-side control section, which obtains the RSSI measured by the measuring section and identifies, based on the obtained RSSI, the position of the wheel assembly in which the tire condition detecting apparatus that has transmitted the signal is provided. The reception-side control section is configured to obtain the RSSI when receiving an instruction signal that instructs to obtain the RSSI.

With this configuration, the reception-side control section starts obtaining the RSSI when receiving the instruction signal. The reception-side control section does not need to obtain the RSSI before receiving the instruction signal. Thus, compared to a case in which the RSSI is always obtained, the load is reduced. This prevents the load on the reception-side control section from being increased and also prevents obtainment of the information related to the tire condition from being hindered.

Effects of the Invention

The present invention reduces the load on the reception-side control section.

MODES FOR CARRYING OUT THE INVENTION

A tire condition detecting apparatus and a tire condition monitoring apparatus according to one embodiment will now be described.

Figure 1A:
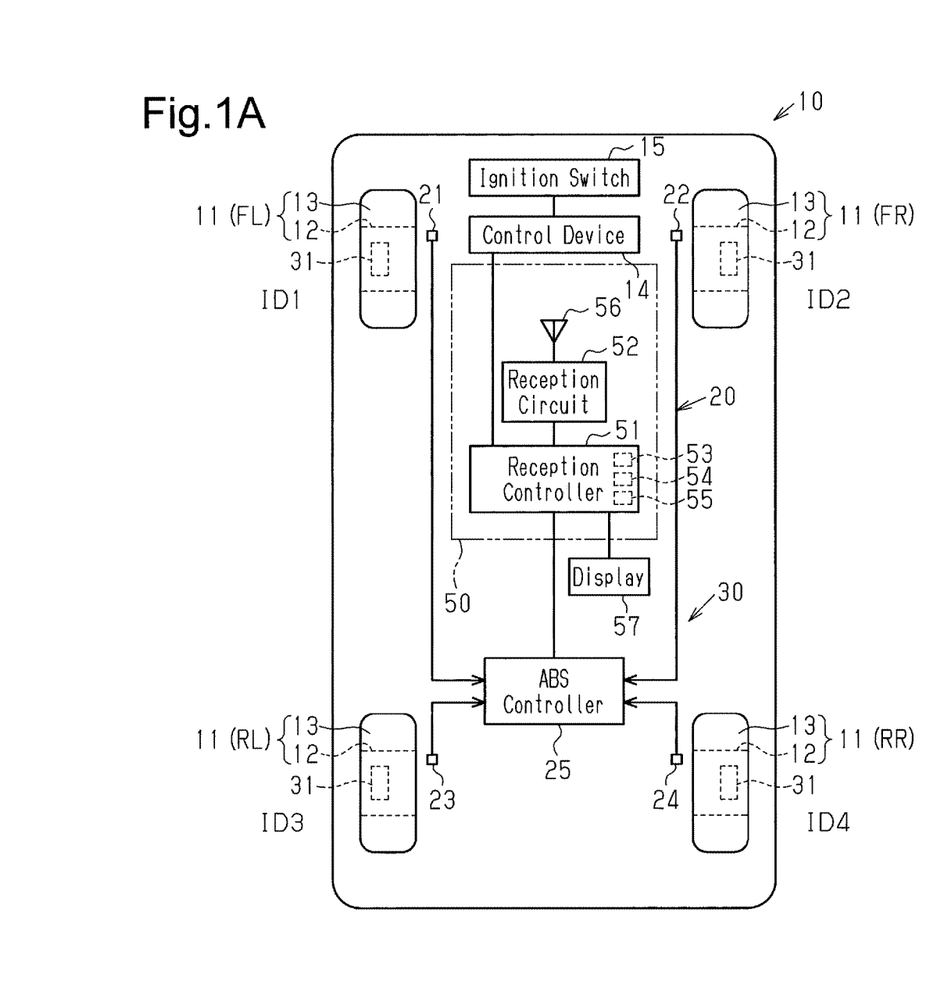
FIG. 1A is a schematic diagram showing a vehicle equipped with a tire condition monitoring apparatus according to one embodiment.

As shown in FIG. 1, a vehicle 10 is equipped with an anti-lock braking system (ABS) 20 and a tire condition monitoring apparatus 30. The ABS 20 includes an ABS controller 25 and rotation sensor units 21 to 24, each of which corresponds to one of four wheel assemblies 11 of the vehicle 10.

The first rotation sensor unit 21 corresponds to a left front wheel assembly FL, which is located at the front left part of the vehicle 10. The second rotation sensor unit 22 corresponds to a right front wheel assembly FR, which is located at the front right part of the vehicle 10. The third rotation sensor unit 23 corresponds to a left rear wheel assembly RL, which is located at the rear left part of the vehicle 10. The fourth rotation sensor unit 24 corresponds to a right rear wheel assembly RR, which is located at the rear right part of the vehicle 10.

Each wheel assembly 11 includes a vehicle wheel 12 and a tire 13 attached to the vehicle wheel 12. The ABS controller 25 is constituted by circuitry such as a microcomputer, that is, a processor, and is programmed to obtain the rotational positions (rotation angles) of the wheel assemblies 11 based on signals from the rotation sensor units 21 to 24. The vehicle 10 is equipped with a control device 14, which controls operations of the vehicle 10 such as starting and stopping of the engine in an integrated manner. An ignition switch 15 is connected to the control device 14. The ignition switch 15 allows the engine to be started and stopped by the driver of the vehicle 10.

Figure 2:
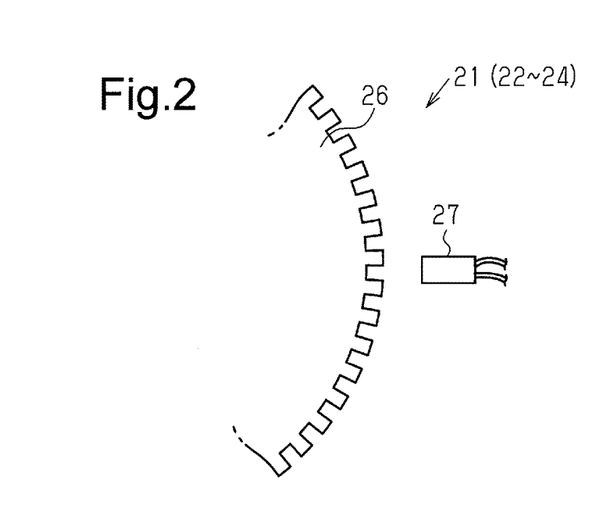
FIG. 2 is a schematic diagram showing a rotation sensor unit of the embodiment.

As shown in FIG. 2, each of the rotation sensor units 21 to 24 includes a gear 26, which rotates integrally with the wheel assembly 11, and a detector 27, which is arranged to face the outer circumferential surface of the gear 26. The gear 26 has multiple teeth (forty-eight teeth in the present embodiment) at equal angular intervals on the outer circumference. The detector 27 detects pulses generated by rotation of the gear 26.

The ABS controller 25 is connected to each detector 27 by a wire and obtains the rotational position of each wheel assembly 11 based on a count value of pulses of the corresponding detector 27 (hereinafter, referred to as pulse count values). Specifically, at each rotation, the gear 26 causes the detector 27 to generate pulses the number of which corresponds to the number of the teeth. The ABS controller 25 counts the pulses generated by the detector 27. The degree of rotation of the gear 26 per pulse count is obtained by dividing 360 degrees by the number of pulses generated by the detector 27 while the wheel assembly 11 rotates one rotation (360 degrees).

Figure 3:
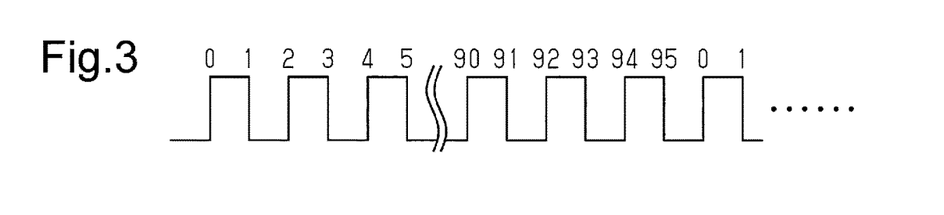
FIG. 3 is a diagram showing pulses generated by a detector of the embodiment and a manner in which the pulses are counted.

As shown in FIG. 3, the ABS controller 25 counts from 0 to 95 by counting rising edges and falling edges of pulses.

As shown in FIG. 1A, the tire condition monitoring apparatus 30 includes four transmitters 31 and a receiver 50. Each transmitter 31 is located in one of the four wheel assemblies 11. The receiver 50 is located in the body of the vehicle 10. Each transmitter 31 is attached to the vehicle wheel 12, to which a tire 13 is attached, such that the transmitter 31 is arranged inside the tire 13. Each transmitter 31 detects the condition of the associated tire 13 and wirelessly transmits a signal including data that indicates the detected tire condition.

Figure 4:
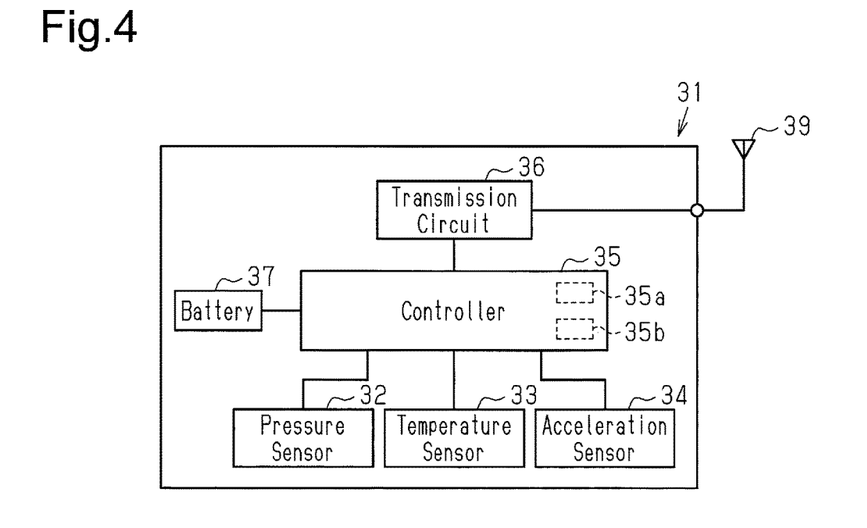
FIG. 4 is a schematic diagram of a transmitter of the embodiment.

As shown in FIG. 4, each transmitter 31 includes a pressure sensor 32, a temperature sensor 33, an acceleration sensor 34, a controller 35, a transmission circuit 36, a battery 37, and a transmission antenna 39. The transmitter 31 is driven by electricity supplied from the battery 37, and the controller 35 controls operations of the transmitter 31 in an integrated manner. The pressure sensor 32 detects the pressure in the corresponding tire 13 (tire air pressure). The temperature sensor 33 detects the temperature in the corresponding tire 13 (tire internal temperature).

Figure 1B:
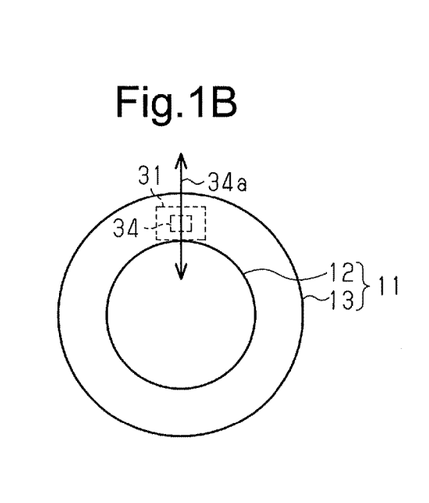
FIG. 1B is a diagram showing the positional relationship between the detection axis of an acceleration sensor and a wheel assembly.

As shown in FIG. 1B, the acceleration sensor 34 has a detection axis 34a that is oriented in one direction along the vertical axis (up-down axis) when the transmitter 31 is at the highest position of the wheel assembly 11. When the transmitter 31 is at the lowest position of the wheel assembly 11, the detection axis 34a is oriented in a different direction from that in the case in which the transmitter 31 is at the highest position in the vertical axis. In the present embodiment, the detection axis 34a is oriented vertically upward when the acceleration sensor 34 is at the highest position, and the detection axis 34a is oriented vertically downward when the acceleration sensor 34 is at the lowest position. The detection axis 34a is used to detect the acceleration in a direction in which centrifugal force acts as the wheel assembly 11 rotates (centrifugal acceleration).

If the acceleration sensor 34 has detection axes other than the detection axis 34a, accelerations acting along the respective detection axes are individually detected. In the present embodiment, however, only the centrifugal acceleration, which is detected along the detection axis 34a, will be discussed. Hereinafter, the acceleration detected by the acceleration sensor 34 refers to the centrifugal acceleration detected along the detection axis 34a.

As shown in FIG. 4, the controller 35 is configured by circuitry such as a microcomputer, that is, a processor, which includes a CPU 35a, a memory section 35b (such as a RAM and a ROM), an input-output port, and a timer. The controller 35 functions as a transmission-side control section. In the memory section 35b, an ID is registered, which is identification information unique to each transmitter 31. The ID is information used to identify each transmitter 31 at the receiver 50.

The controller 35 obtains, at predetermined obtainment intervals, the tire pressure detected by the pressure sensor 32, the tire internal temperature detected by the temperature sensor 33, and the acceleration detected by the acceleration sensor 34. In the present embodiment, the pressure sensor 32 and the temperature sensor 33 function as a condition detecting section.

The controller 35 determines whether the vehicle 10 is moving based on the acceleration detected by the acceleration sensor 34. When the vehicle 10 moves, the centrifugal force acting on the acceleration sensor 34 increases due to rotation of the wheel assembly 11, and the acceleration detected by the acceleration sensor 34 increases, accordingly. A value that is greater than the acceleration detected when the vehicle 10 is in a stopped state is set as a movement determination threshold, and whether the vehicle 10 is moving is determined by determining whether the acceleration detected by the acceleration sensor 34 is greater than the movement determination threshold is detected.

The controller 35 outputs data containing the tire air pressure data, the tire internal temperature data, and the ID to the transmission circuit 36. The transmission circuit 36 generates signals and wirelessly transmits the signals from the transmission antenna 39. The transmission circuit 36 functions as a transmission section. The controller 35 is programmed to control the transmission circuit 36. In the present embodiment, two types of signals, or a stationary signal and a position detecting signal, are transmitted from the transmission antenna 39. The stationary signal is a signal that has been modulated to transmit data and transmitted at predetermined time intervals. The position detecting signal, which is not designed to transmit data, is continuously transmitted at a constant power during a predetermined transmission time. In the present embodiment, each transmitter 31 functions as a tire condition detecting apparatus.

As shown in FIG. 1A, the receiver 50 includes a reception controller 51, a reception circuit 52, and a reception antenna 56. The reception controller 51 of the receiver 50 is connected to a display 57. Also, the reception controller 51 is connected to the ABS controller 25 and the control device 14.

The reception controller 51 is configured by circuitry such as a microcomputer, that is, a processor, which includes an AD converter 53, a CPU 54, a memory section 55 (such as a ROM and a RAM), and an input-output port. The memory section 55 stores programs for controlling operations of the receiver 50 in an integrated manner.

Figure 1C:
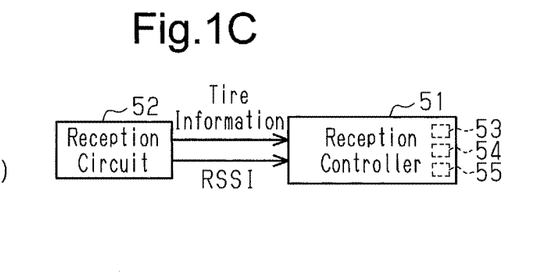
FIG. 1C is a diagram showing the relationship between a reception circuit and a reception controller.

As shown in FIG. 1C, the reception circuit 52 demodulates signals delivered from the transmitters 31 via the reception antenna 56 and outputs information regarding the conditions of the tires 13 (tire information) to the reception controller 51. The reception circuit 52 measures the received signal strength indications, or the RSSIs, of received signals, and delivers the RSSIs of the signals to the reception controller 51. Thus, in the present embodiment, the reception circuit 52 functions as a receiving section, which receives signals, and a measuring section, which measures the RSSIs of the signals.

The reception controller 51 obtains information regarding each tire 13 delivered from the reception circuit 52 and obtains the tire state that corresponds to the transmitter 31 that is the source of the transmitted signal. Also, the reception controller 51 converts the information regarding the RSSI delivered from the reception circuit 52 into a digital value and obtains the digital value. The reception controller 51 of the present embodiment is switched between an obtainment state for obtaining RSSIs and a non-obtainment state for refraining from obtaining RSSIs. Further, the reception controller 51 obtains the pulse count values of the rotation sensor units 21 to 24 based on information delivered from the ABS controller 25. The reception controller 51 causes the display 57 to show information regarding the air pressures.

Also, the reception controller 51 determines whether there is an abnormality in any of the tires 13 based on the information regarding the states of the tires 13. For example, the reception controller 51 determines whether the air pressure of each tire 13 is greater than a lower pressure threshold and determines that there is an abnormality in the tire 13 (insufficient air pressure) if the air pressure of the tire 13 is less than or equal to the low pressure threshold. As the low pressure threshold, for example, 80% of the recommended air pressure of the tires 13 is used. If there is an abnormality in any of the tires 13, the reception controller 51 notifies the driver of the abnormality of the tire 13 through the display 57 or an informing device.

Next, a wheel assembly position identifying process will be described, which is executed for determining which one of the four wheel assemblies 11 corresponds to the information of the tire condition contained in the stationary signal from each of the four transmitters 31.

Control executed by the controller 35 of each transmitter 31 will first be described. If the acceleration detected by the acceleration sensor 34 is greater than the movement determination threshold, that is, if the vehicle 10 is determined to be moving, the controller 35 causes a stationary signal containing information of the tire condition detected by various sensors to be transmitted at predetermined transmission intervals. At this time, data contained in the stationary signal is differentiated through the following process. The following process is repeatedly executed when the acceleration detected by the acceleration sensor 34 is greater than the movement determination threshold.

Figure 5:
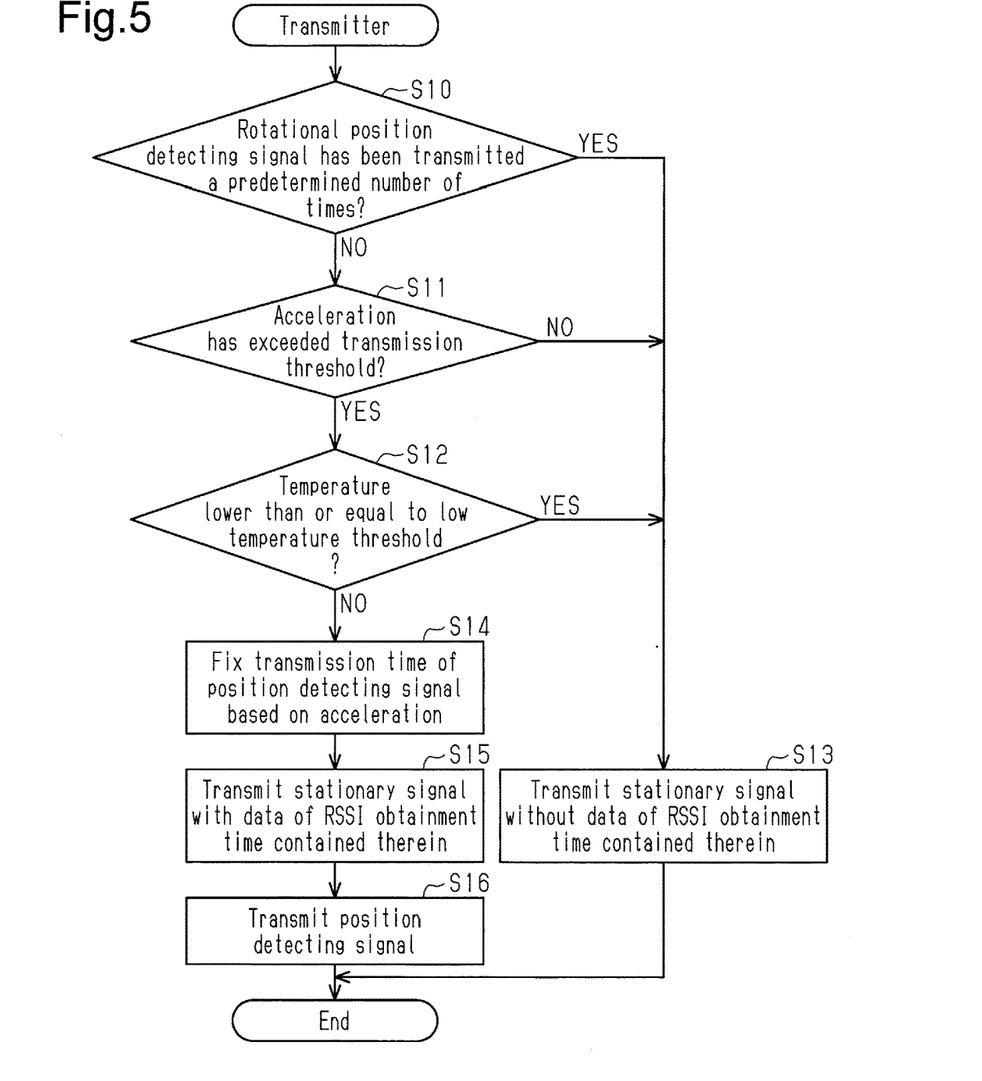
FIG. 5 is a flowchart showing a procedure executed by the controller of each transmitter when the acceleration detected by the acceleration sensor is greater than a movement determination threshold.

As shown in FIG. 5, the controller 35 determines, at step S10, whether the transmitter 31 has transmitted the position detecting signal a predetermined number of times since the vehicle 10 started driving. The predetermined number of times is set to a number of times at which it is predicted that the reception controller 51 can identify the position of the wheel assembly 11 in which the transmitter 31 that has transmitted the position detecting signal is located.

If the acceleration detected by the acceleration sensor 34 has remained less than or equal to the movement determination threshold for at least a predetermined time, in other words, if the vehicle 10 has been in a stopped state for at least the predetermined time, the controller 35 resets the number of times of transmission of the position detecting signal. Thereafter, if the acceleration detected by the acceleration sensor 34 exceeds the movement determination threshold, transmission of the position detecting signal will be executed the predetermined number of times again.

That is, the controller 35 cancels suspension of transmission of the position detecting signal when the vehicle has been in a stopped state for a predetermined time. The predetermined time is set, for example, to a time between tire rotations, that is, a time between changes of the positions of the wheel assemblies 11. Therefore, the positions of the wheel assemblies 11 are identified after being changed.

Figure 6A:
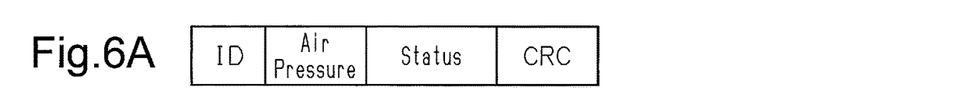
FIG. 6A is a diagram showing the data structure of a stationary signal transmitted from each transmitter when the acceleration detected by the acceleration sensor is less than or equal to a transmission threshold.

If the decision outcome of step S10 is positive, the controller 35 executes step S13. At step S13, the controller 35 transmits a stationary signal. As shown in FIG. 6A, the stationary signal contains ID data, air pressure data of the tire 13, status indicating the condition of the vehicle 10, and an error-correction code such as a cyclic redundancy check (CRC).

As shown in FIG. 5, if the decision outcome of step S10 is negative, the controller 35 executes step S11. At step S11, the controller 35 determines whether the acceleration detected by the acceleration sensor 34 is greater than a transmission threshold. For example, the transmission threshold is set to a value that is greater than the movement determination threshold. When the acceleration detected by the acceleration sensor 34 is less than or equal to the movement determination threshold, the vehicle 10 is assumed to be in a stopped state or moving at a low speed. Step S11 is executed to prevent the position detecting signal from being transmitted when the vehicle 10 is in a stopped state or moving at a low speed. If the decision outcome of step S11 is positive, the controller 35 executes step S12. In contrast, if the decision outcome of step S11 is negative, the controller 35 executes step S13.

At step S12, the controller 35 determines whether the temperature in the tire 13 detected by the temperature sensor 33 is lower than or equal to a low temperature threshold. The low temperature threshold is set to a temperature that lowers the voltage of the battery 37 to a level at which transmission of signals is hindered. When the voltage of the battery 37 is lowered to a level at which transmission of signals is hindered, signals cannot be easily transmitted. In such a case, the stationary signal is transmitted in priority to the position detecting signal.

If the decision outcome of step S12 is negative, the controller 35 executes step S14. At step S14, the controller 35 fixes the transmission time of the position detecting signal based on the acceleration detected by the acceleration sensor 34.

In the present embodiment, the transmission time of the position detecting signal is set to be longer than the time in which the wheel assembly 11 rotates one rotation. The time in which the wheel assembly 11 rotates one rotation varies depending on the speed of the vehicle 10. The greater the speed of the vehicle 10, the shorter the time of one rotation of the wheel assembly 11 becomes. As the speed of the vehicle 10 increases, the acceleration detected by the acceleration sensor 34 increases, accordingly. Thus, the controller 35 shortens the transmission time of the position detecting signal as the acceleration detected by the acceleration sensor 34 increases.

In the present embodiment, a high speed threshold, which is greater than the transmission threshold, is used. When the acceleration detected by the acceleration sensor 34 exceeds the high speed threshold, the transmission time of the position detecting signal is shortened compared to a case in which the acceleration is less than or equal to the high speed threshold.

Figure 6B:
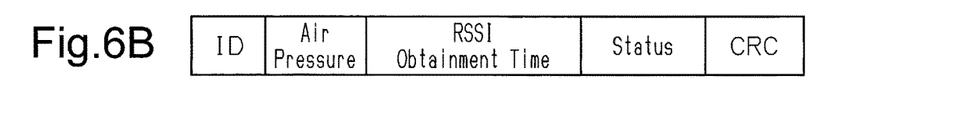
FIG. 6B is a diagram showing the data structure of a stationary signal transmitted from each transmitter when the acceleration detected by the acceleration sensor is greater than the transmission threshold.

Next, at step S15, the controller 35 causes a stationary signal to be transmitted. As shown in FIG. 6B, the stationary signal transmitted at step S15 contains data of RSSI obtainment time in addition to the ID data, the air pressure data of the tire 13, the status indicating the condition of the vehicle 10, and an error-correction code such as a CRC. The RSSI obtainment time is set to a time that is slightly longer than the transmission time of the position detecting signal fixed at step S14.

The stationary signal transmitted at step S13 does not contain the RSSI obtainment time, while the stationary signal transmitted at step S15 contains the RSSI obtainment time. The stationary signal containing data that indicates the RSSI obtainment time is a signal that instructs the reception controller 51 to obtain the RSSI.

As shown in FIG. 5, when the stationary signal is transmitted at step S15, the controller 35 causes the position detecting signal to be transmitted at the subsequent step, or step S16. The position detecting signal is transmitted at a constant power for the transmission time fixed at step S14.

After the stationary signal is transmitted at step S15, the position detecting signal is transmitted before the stationary signal is transmitted next time. To cause the reception controller 51 to obtain the RSSI of the position detecting signal, the transmitter 31 instructs the reception controller 51 to obtain the RSSI through the stationary signal before transmitting the position detecting signal.

Next, control executed by the reception controller 51 of the receiver 50 will be described. As described above, the reception controller 51 receives data related to the tire conditions and the data related to the RSSIs (data indicating the RSSI obtainment time) in the data contained in the stationary signals.

Figure 7:
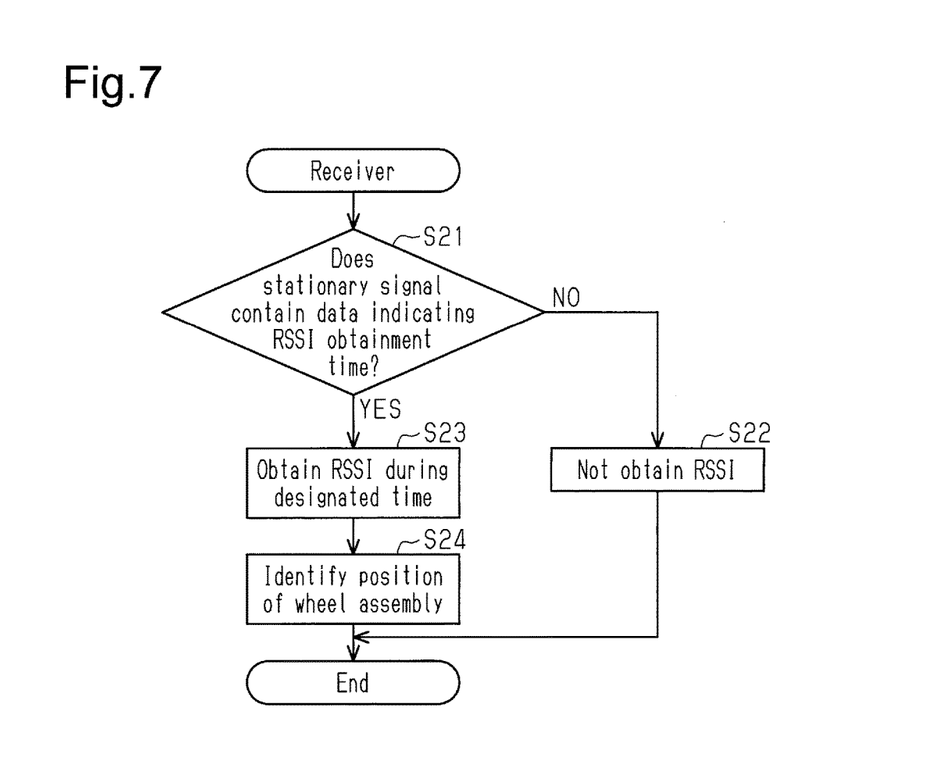
FIG. 7 is a flowchart showing a procedure performed by the reception controller of the receiver.

As shown in FIG. 7, at step S21, the reception controller 51 determines whether the data of the stationary signal delivered from the reception circuit 52 contains the data indicating the RSSI obtainment time. If the decision outcome of step S21 is negative, that is, if the data of the stationary signal does not contain data indicating the RSSI obtainment time, the reception controller 51 executes step S22. At step S22, the reception controller 51 terminates the process without obtaining the RSSIs from the reception circuit 52.

If the decision outcome of step S21 is positive, that is, if the data of the stationary signal contains data indicating the RSSI obtainment time, the reception controller 51 executes step S23.

At step S23, the reception controller 51 obtains the RSSI during the time designated by the RSSI obtainment time. That is, upon receiving the stationary signal, which contains data indicating the RSSI obtainment time, obtainment of the RSSI is started. The obtainment is then stopped after the designated time. In the present embodiment, the stationary signal, which contains data indicating the RSSI obtainment time, functions as an instruction signal, which instructs the reception controller 51 to obtain the RSSI.

After transmitting the stationary signal, the transmitter 31 transmits the position detecting signal. Thus, the reception controller 51 subsequently obtains the RSSI of the position detecting signal.

The position detecting signal does not contain data indicating ID. However, when receiving the position detecting signal after receiving the stationary signal containing the RSSI obtainment time, the reception controller 51 determines that the received position detecting signal has been transmitted from the transmitter of the ID that is contained in the stationary signal that was received immediately before the position detecting signal was transmitted. In this manner, the reception controller 51 determines that the transmitter 31 of which ID has transmitted the position detecting signal.

Next, at step S24, the reception controller 51 identifies, from among the four wheel assemblies 11, the wheel assembly 11 that accommodates the transmitter 31 that has transmitted the position detecting signal. Identification of the position of the wheel assembly 11 is performed through synchronization of the RSSI obtained by the reception controller 51 and the rotational positions (pulse count values) of the wheel assemblies 11 obtained by the ABS controller 25. The process for identifying the position of the wheel assembly 11 will now be described.

Figure 8:
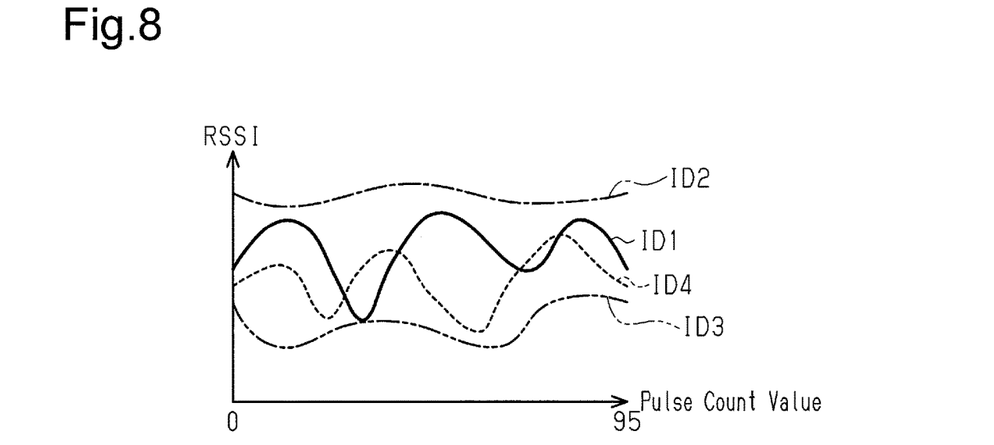
FIG. 8 is a diagram showing the RSSIs of position detecting signals transmitted from the respective transmitters when the rotational speeds of the wheel assemblies are the same.

As shown in FIG. 8, the RSSIs of the position detecting signals obtained by the reception controller 51 vary in accordance with the rotational positions of the wheel assemblies 11, that is, the pulse count values of the rotation sensor units 21 to 24 detected by the ABS controller 25. The transmitter 31 provided in each wheel assembly 11 transmits position detecting signal while rotating with the wheel assembly 11. The position detecting signals transmitted from the transmitters 31 are attenuated by obstacles such as occupants and pieces of baggage in the vehicle 10 before being received by the receiver 50.

The degrees of attenuation of the position detecting signals due to obstacles vary depending on the positional relationship between each transmitter 31 (each transmission antenna 39) and the receiver 50 (the reception antenna 56). This is because change in the positional relationship between each transmitter 31 and the receiver 50 changes the distance from the transmitter 31 to the receiver 50, the directivity of the transmission antenna 39, and the positional relationship between the transmitter 31 and the obstacles.

When the transmitter 31 transmits the position detecting signal while rotating with the wheel assembly 11, the position detecting signal is transmitted while the positional relationship between the transmitter 31 and the receiver 50 is being changed. Thus, rotational positions (rotation angles) of the wheel assembly 11 are divided into a range in which the position detecting signal is less likely to be attenuated by obstacles and a range in which the position detecting signal is easily attenuated by obstacles.

Therefore, if the position detecting signal is transmitted in one rotation of the wheel assembly 11, part of the signal transmitted in the range of less likelihood of attenuation has a stronger RSSI, and part of the signal transmitted in the range of greater likelihood of attenuation has a weaker RSSI.

Also, in a case in which the RSSIs of the position detecting signals are obtained when all the wheel assemblies 11 rotate one rotation at the same speed, the reception levels (absolute values) of the RSSIs and the pulse count values at extreme values of the RSSIs (the rotational positions of the wheel assemblies 11) are different among the transmitters 31, which have transmitted the position detecting signals.

This is because the difference in positions of the transmitters 31 results in difference in the degrees of attenuation due to obstacles.

Although the range of less likelihood of attenuation and the range of greater likelihood of attenuation of the position detecting signal vary depending on the presence/absence and the positions of obstacles, it is assumed that the positions of obstacles in the vehicle 10 remain the same during the period of a single trip (for example, from when the ignition switch is turned to when the ignition switch 15 is turned off). Also, it is predicted that obstacles such as occupants or pieces of baggage will not move frequently during driving of the vehicle 10. Therefore, if errors are not factored in, the rotational position (rotation angle) of each wheel assembly 11 corresponding to an extreme value of the RSSI is predicted to remain the same each time.

The numbers of rotations (rotation speeds) of the wheel assemblies 11 during driving of the vehicle 10 vary, for example, due to the influence of the differential gear. Therefore, when the rotational positions of the wheel assemblies 11 at which the RSSI of the position detecting signal transmitted from a transmitter 31 of the same ID has an extreme value are detected more than once, the rotational position at which the RSSI has an extreme value remains the same at every detection only in the wheel assembly 11 in which the transmitter that has transmitted the position detecting signal. In reality, due to measuring errors and tolerances of the tire condition monitoring apparatus 30, the rotational position of each wheel assembly 11 corresponding to an extreme value of the RSSI slightly varies each time the rotational position is detected.

Thus, the reception controller 51 groups the position detecting signals transmitted from the four transmitters 31 more than once according to the ID and identifies that the transmitter 31 of the corresponding ID is located in the wheel assembly 11 of the smallest variation in the rotational position of the wheel assembly 11 at which the RSSI has an extreme value. Therefore, the reception controller 51 functions as a reception-side control section. If the RSSI of the position detecting signal transmitted from each transmitter 31 has two or more extreme values, the position of the corresponding wheel assembly 11 may be identified either from one of the extreme values or from all the extreme values.

FIG. 1A illustrates a hypothetical case in which a transmitter 31 of an ID1 is provided in the left front wheel assembly FL, a transmitter 31 of an ID2 is provided in the right front wheel assembly FR, a transmitter 31 of an ID3 is provided in the left rear wheel assembly RL, and a transmitter 31 of an ID4 is provided in the right rear wheel assembly RR. In this hypothetical case, the reception controller 51 identifies the position of the corresponding wheel assembly 11 from the minimum value, which is one of extreme values of the RSSI.

FIGS. 9A to 9D illustrate, focusing on the position detecting signal transmitted from the transmitter 31 of the ID1 (hereinafter, referred to as the position detecting signal of the ID1), the RSSI of the position detecting signal of the ID1 at rotational positions (the pulse count values) per rotation of the wheel assemblies 11 in four occasions.

The reception controller 51 refers to the rotational positions of the wheel assemblies 11, or the pulse count values detected by the rotation sensor units 21 to 24, at the time when the position detecting signal of the ID1 has the minimum value. The reception controller 51 identifies the rotation sensor unit that has the smallest variation of pulse count values at the time when the RSSI of the position detecting signal of the ID1. For example, the reception controller 51 obtains, from the rotation sensor units 21 to 24, the RSSI of the position detecting signal of the ID1 more than once and counts the number of times when the minimum value of the RSSI falls within a predetermined range for each of the rotational sensor units 21 to 24.

The predetermined range is a set by factoring in tolerances of the components and measuring errors such that the extreme values of the RSSI can be assumed to be at the same position. The reception controller 51 determines that one of the rotation sensor units 21 to 24 of which the number of times (the ratio) that the minimum value of the RSSI falls within the predetermined range is the largest is the one that corresponds to the wheel assembly 11 having the smallest variation in the pulse count value at which the RSSI has the minimum value.

Figure 9A:
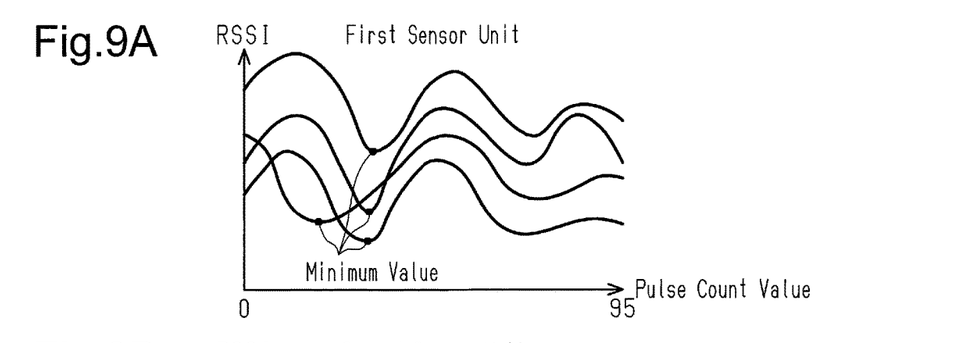
FIG. 9A is a graph showing the relationship between the RSSI and the pulse count value of the first rotation sensor unit when the position detecting signal transmitted from the transmitter of the ID1 is received more than once.
Figure 9B:
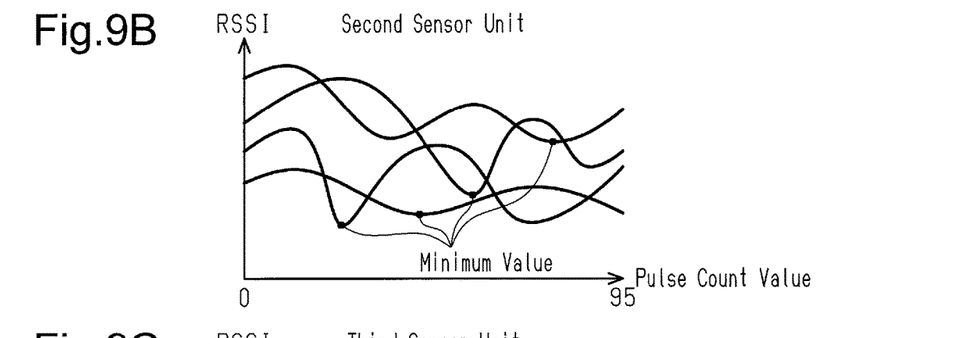
FIG. 9B is a graph showing the relationship between the RSSI and the pulse count value of the second rotation sensor unit when the position detecting signal transmitted from the transmitter of the ID1 is received more than once.
Figure 9C:
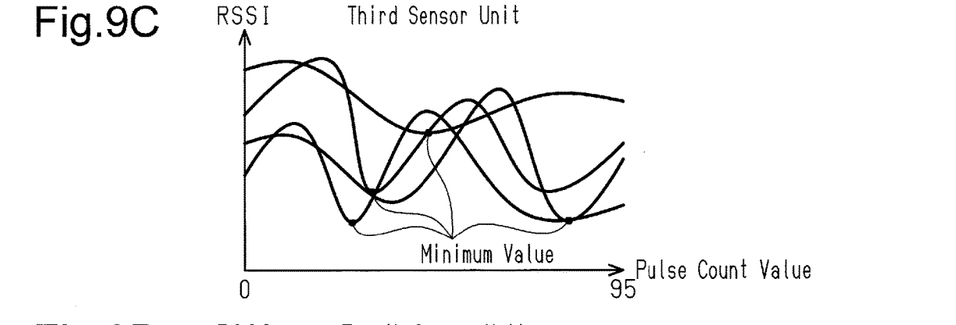
FIG. 9C is a graph showing the relationship between the RSSI and the pulse count value of the third rotation sensor unit when the position detecting signal transmitted from the transmitter of the ID1 is received more than once.
Figure 9D:
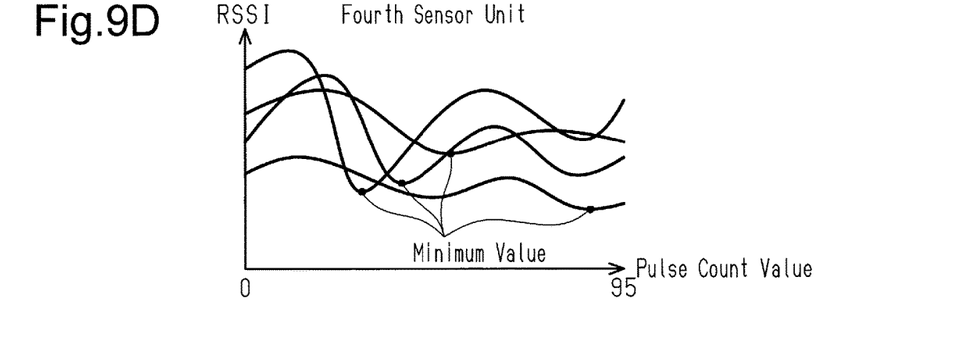
FIG. 9D is a graph showing the relationship between the RSSI and the pulse count value of the fourth rotation sensor unit when the position detecting signal transmitted from the transmitter of the ID1 is received more than once.

In the present embodiment, the reception controller 51 determines that the pulse count value detected by the first rotation sensor unit 21 has the smallest variation. Since the first rotation sensor unit 21 corresponds to the left front wheel assembly FL, the transmitter 31 of the ID1 is determined to be provided in the left front wheel assembly FL. For each of the transmitter 31 of the ID2, the transmitter 31 of the ID3, and the transmitter 31 of the ID4, the position of the wheel assembly 11 can be identified.

When the position detecting signal is received more than once as shown in FIGS. 9A to 9D, the reception levels (absolute values) of the RSSIs vary. This is because the surrounding environment causes difference in the degrees of attenuation of the position detecting signal. The absolute value of the RSSI is likely to change due to influence of the surrounding environment. However, even if the absolute value of the RSSI varies, the rotational position of the wheel assembly 11 corresponding to an extreme value of the RSSI is not easily changed.

When an RSSI is detected more than once, an extreme value of the RSSI does not remain at the same position in some cases, even though obstacles in the vehicle 10 have not moved. This is because the position the extreme value of the RSSI can vary depending on the surrounding environment.

That is, in a case in which objects that affect the RSSI, such as other vehicles, are present around the vehicle 10, the position of the extreme value of the RSSI varies. In such a case, however, the vehicle 10 is likely to be temporarily in a stopped state, for example, at a traffic light, and the position detecting signals are not transmitted while the vehicle 10 is in a stopped state.

Also, if another vehicle approaches the vehicle 10 while moving, that state is considered to rarely last for a long time. Thus, when the position detecting signal is detected more than once, extreme values of the RSSI will converge to a constant position in the wheel assembly 11 (a certain rotational position).

Operation of the tire condition monitoring apparatus 30 will now be described.

Figure 10A:
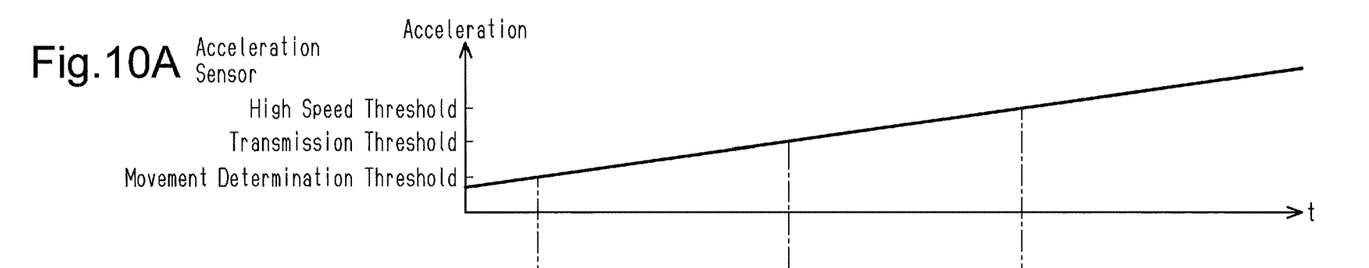
FIG. 10A is a timing diagram showing the acceleration detected by an acceleration sensor.

When the vehicle 10 accelerates and the number of rotations (rotation speed) of the wheel assemblies 11 increases as shown in FIG. 10A, the acceleration detected by the acceleration sensors 34 increases, accordingly.

Figure 10B:
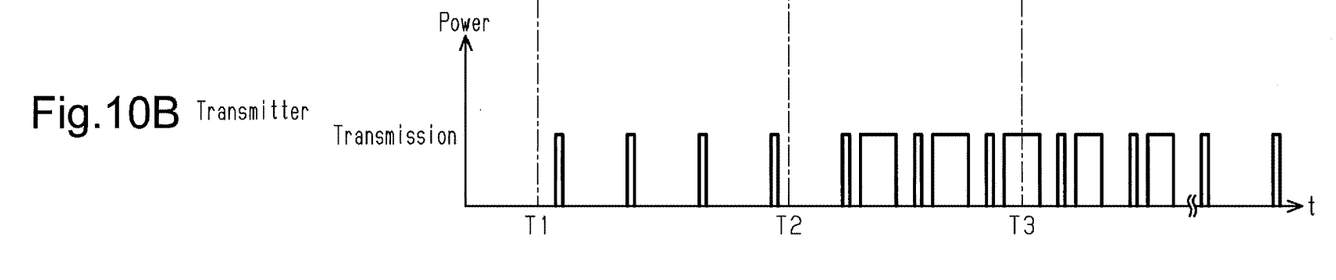
FIG. 10B is a timing diagram showing a signal transmitted from a transmitter.

When the acceleration detected by the acceleration sensors 34 exceeds the movement determination threshold at point in time T1 as shown in FIGS. 10A and 10B, the transmitters 31 transmit a stationary signal at predetermined time intervals.

When the acceleration detected by the acceleration sensors 34 exceeds the transmission threshold at point in time T2 as shown in FIGS. 10A and 10B, the transmitters 31 transmit the position detecting signals subsequent to the stationary signals.

Figure 10C:
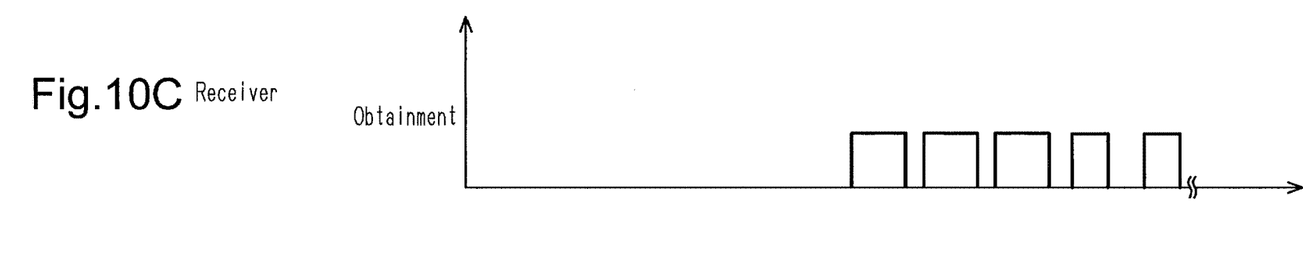
FIG. 10C is a timing diagram showing the manner in which the receiver obtains RSSI.

As shown in FIG. 10C, since the stationary signal includes RSS measurement data, the reception controller 51 obtains the RSSI of the position detecting signal when receiving the stationary signal. The reception controller 51 identifies the positions of the wheel assemblies 11, in each of which a transmitter 31 is provided, based on variations in the rotational positions of the wheel assemblies 11 at which the RSSIs of the position detecting signals have extreme values.

When the acceleration detected by the acceleration sensors 34 exceeds the high speed threshold at point in time T3, the transmission time of the position detecting signal is shortened compared to that in a case in which the acceleration detected by the acceleration sensors 34 is greater than the transmission threshold and less than the high speed threshold.

When having transmitted the position detecting signal a predetermined number of times since the starting of driving (from when the ignition switch 15 was turned on), the transmitters 31 stop transmitting the position detecting signal.

The above described embodiment has the following advantages.

(1) Before the position detecting signal is transmitted, the stationary signal is transmitted with the RSSI obtainment time incorporated therein. It is thus possible to instruct the reception controller 51 to obtain the RSSI. When it is necessary to obtain the RSSI, that is, when the position detecting signal is transmitted, the reception controller 51 is allowed to obtain the RSSI. Compared to a case in which the RSSI is always obtained, the load on the reception controller 51 is reduced. Thus, obtainment of tire information is not hindered by increased load on the reception controller 51 due to constant obtainment of the tire information and the RSSI.

(2) The obtainment of the RSSI is instructed the stationary signal, which contains data indicating the RSSI obtainment time. Thus, the reception controller 51 obtains the RSSI only during the time designated by the RSSI obtainment time. This eliminates the necessity for transmitting a signal that instructs to stop the RSSI.

(3) The RSSI of the position detecting signal fluctuates and has extreme values as the wheel assemblies 11 rotate. The extreme values of the RSSI are expected not to fluctuate or to fluctuate at limited frequency within a single trip. Thus, the reception controller 51 identifies the positions of the wheel assemblies 11, in which the corresponding transmitters 31 are provided, based on variations in the rotational positions of the wheel assemblies 11 at which the RSSI reaches the extreme value. Therefore, even if the magnitude relationship between the absolute values of the RSSI change due to the surrounding environment, the positions of the wheel assemblies 11 are identified as long as the extreme values of the RSSI remain the same.

(4) The transmitters 31 transmit the position detecting signal when the acceleration detected by the acceleration sensors 34 is greater than the transmission threshold. Thus, when the vehicle 10 is in a stopped state or moving at a low speed, the position detecting signal is not transmitted. Since the wheel assemblies 11 do not rotate when the vehicle 10 is in a stopped state, the positions of the wheel assemblies 11 cannot be identified even if the position detecting signals are transmitted. Therefore, the power of the battery 37 can be saved by not transmitting the position detecting signals when the vehicle 10 is in a stopped state.

Also, when the vehicle 10 is moving at a low speed, the wheel assemblies 11 take relatively long time to rotate one rotation, which extends the transmission time of the position detecting signals. Therefore, the power of the battery 37 can be saved by not transmitting the position detecting signals when the vehicle 10 is driving at a slow speed.

(5) When the acceleration detected by the acceleration sensors 34 increases, the transmission time of the position detecting signal is shortened. Therefore, consumption of the power of the battery 37 is reduced compared to a case in which the position detecting signal is always transmitted for the same transmission time regardless of the magnitude of the acceleration detected by the acceleration sensors 34.

(6) After the ignition switch 15 is turned on, the position detecting signal is transmitted from the transmitters 31 a predetermined number of times. Thus, the number of times the position detecting signal is transmitted is reduced compared to a case in which the position detecting signal continues to be transmitted even after the positions of the wheel assemblies 11, in each of which a transmitter 31 is provided, are identified. This reduces the consumption of the power of the battery 37 caused by transmission of the position detecting signal.

(7) When the temperature in the tires 13 is lower than or equal to the low temperature threshold, the position detecting signal is not transmitted even if the acceleration detected by the acceleration sensors 34 exceeds the transmission threshold. The voltage of the battery 37 drops significantly when the temperature is excessively low.

The tire condition monitoring apparatus 30 is preferably capable of identifying that the transmitter 31 of which ID is located in which of the wheel assemblies 11. However, if it is possible to provide notice of an abnormality in any of the wheel assemblies 11, the driver can be informed of the abnormality even if the positions of the wheel assemblies 11, in each of which a transmitter 31 is provided, have not been identified.

When the voltage of the battery 37 is significantly low and transmission of signals is difficult, only the stationary signal is transmitted without transmitting the position detecting signal. Accordingly, the voltage will not be lowered to the level insufficient to transmit the position detecting signal, so that a notice of an abnormality of the wheel assembly 11 will be properly provided.

The embodiment may be modified as follows.

In the above illustrated embodiment, the stationary signal is transmitted with the RSSI obtainment time incorporated therein, and the receiver 50 (the reception controller 51) is instructed to obtain the RSSI by reception of the stationary signal. However, instead of the signal containing the data indicating the obtainment time, a signal for instructing to start the obtainment of the RSSI may be transmitted.

Figure 11A:
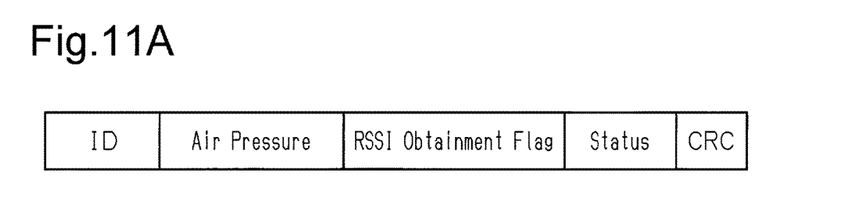
FIG. 11A is a diagram showing the data structure contained in a stationary signal according to a modification.
Figure 11B:
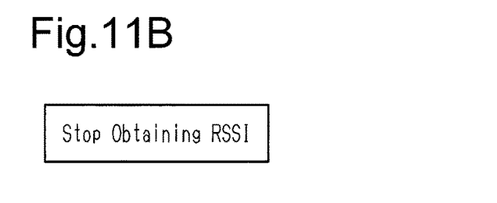
FIG. 11B is a diagram showing the data structure contained in a stop signal.

As shown in FIG. 11A, the data of the stationary signal contains an RSSI obtainment flag. When receiving the stationary signal, the receiver 50 starts obtaining the RSSI. After transmitting the stationary signal, which contains the RSSI obtainment flag, the transmitter 31 transmits the position detecting signal. After transmitting the position detecting signal, the transmitter 31 transmits a stop signal, which contains data indicating stoppage of RSSI obtainment as shown in FIG. 11B. When receiving the stop signal, the receiver 50 stops obtaining the RSSI.

In the above illustrated embodiment, the positions of the wheel assemblies 11, in each of which a transmitter 31 is provided, are identified based on the variation in the rotational positions of the wheel assemblies 11 at which the RSSIs have extreme values. However, the positions of the wheel assemblies 11 may be identified based on the magnitude relationship of the RSSIs. For example, the receiver 50 (the reception antenna 56) is arranged at different distances from the respective transmitters 31 and measures the RSSIs of the position detecting signals transmitted from the respective transmitters 31. The position detecting signals transmitted from the transmitters 31 are more attenuated as the distance from the receiver 50 increases. Thus, the transmitter 31 that has transmitted the position detecting signal of the greatest RSSI is identified as the one mounted in the wheel assembly 11 located closest to the receiver 50. Accordingly, it is identified that the order of the distances of the respective wheel assemblies 11 from the receiver 50 corresponds to the order of the magnitudes of the RSSIs of the detected position detecting signals.

The transmitter 31 may transmit the position detecting signal at constant intervals regardless of the acceleration detected by the acceleration sensor 34. In this case, the position detecting signal is transmitted even if the vehicle 10 is in a stopped state or moving at a low speed.

The transmission time of the position detecting signal may be maintained at a constant value regardless of the magnitude of the acceleration detected by the acceleration sensor 34. In this case, the transmitter 31 may be configured without the acceleration sensor 34. This reduces the number of components.

The positions of the wheel assemblies 11 may be identified based on variation of the pulse count values when the RSSI reaches the maximum value, which is one of the extreme values. Likewise, the positions of the wheel assemblies 11 may be identified from variation of the pulse count value when the RSSI reaches one of the extreme values that is different from the minimum value or the maximum value.

When the RSSI has two or more extreme values, the positions of the wheel assemblies 11, in each of which a transmitter 31 is provided, may be identified based on variation in the rotational positions of the wheel assemblies 11 when the RSSI reaches each of the extreme values. For example, one of the extreme values is defined as a first extreme value, and another extreme value is defined as a second extreme value. If the positions of the wheel assemblies 11, in each of which a transmitter 31 is provided, cannot be identified based on variation in the rotational positions of the wheel assemblies 11 when the RSSI reaches the first extreme value, the positions of the wheel assemblies 11 may be identified based on variation in the rotational positions of the wheel assemblies 11 when the RSSI reaches the second extreme value.

The positions of the wheel assemblies 11, in each of which the corresponding transmitter 31 is provided, may be identified based on variation in the rotational positions of the wheel assemblies 11 when the RSSI reaches the first extreme value and such variation when the RSSI reaches the second extreme value. In this case, the reception controller 51 determines the wheel assembly 11 of the smallest variation in the rotational position when the RSSI reaches the first extreme value and the second extreme value, and determines that the wheel assembly 11 in which the number of times (the ratio of) the variation is determined to be small is great (high) accommodates the transmitter 31 that has transmitted the position detecting signal.

The position detecting signal may be continuously transmitted from each transmitter 31 for a time shorter than the time required for the wheel assembly 11 to rotate one rotation. For example, the time in which the position detecting signal is transmitted may be a time in which the wheel assembly 11 rotates 300 degrees (⅚ rotations) or 270 degrees (¾ rotations). That is, the transmission time of the position detecting signal may be any value as long as at least one extreme value is detected in that time.

If the time in which the position detecting signal is transmitted is shorter than the time for the wheel assemblies 11 to rotate one rotation, the rotational position of the wheel assembly 11 at which the position detecting signal is transmitted preferably remains constant at each transmission. For example, the constant rotational position of the wheel assembly 11 may be the one when the transmitter 31 (the acceleration sensor 34) is at the lowest position in the wheel assembly 11, and the transmission circuit 36 may transmit the position detecting signal each time the transmitter 31 reaches the lowest position in the wheel assembly 11.

The transmitter 31 reaching the lowest position in the wheel assemblies 11 can be detected when the acceleration sensor 34 detects that the gravitational acceleration becomes 1 G (±1 G) or when the rotational position of the wheel assembly 11 is detected.

Two or more high speed thresholds may be used. For example, a first high speed threshold and a second high speed threshold, which is greater than the first high speed threshold, may be set. In this case, when the acceleration detected by the acceleration sensor 34 exceeds the first high speed threshold, the transmission time of the position detecting signal is shortened compared to that in a case in which the acceleration detected by the acceleration sensor 34 is less than or equal to the first high speed threshold. When the acceleration detected by the acceleration sensor 34 exceeds the second high speed threshold, the transmission time of the position detecting signal is shortened further.

The stationary signal may also function as the position detecting signal. Specifically, the transmission time of the stationary signal is set to a length that allows the positions of the wheel assemblies 11 to be identified (the RSSI to be detected), so that the stationary signal has the same function as that of the position detecting signal of the above illustrated embodiment. In this case, since the stationary signal functions as the position detecting signal, the position detecting signal, which is different from the stationary signal, does not need to be transmitted.

The position detecting signal may contain an ID when being transmitted.

In the above illustrated embodiment, when the temperature in the tire 13 detected by the temperature sensor 33 is lower than or equal to the low temperature threshold, the position detecting signal is not transmitted. Instead, in such a case, the frequency of transmission of the position detecting signal may be reduced.

The position detecting signal may be transmitted regardless of the temperature in the tire 13 detected by the temperature sensor 33. In this case, the temperature sensor 33 may be omitted.

In the above illustrated embodiment, when the temperature in the tire 13 detected by the temperature sensor 33 is lower than or equal to the low temperature threshold, the position detecting signal is not transmitted. Instead, the voltage of the battery 37 may be detected, and when the voltage is lower than or equal to a voltage threshold, the transmission of the position detecting signal may be restricted. The voltage threshold value may be set, for example, to a value that is slightly higher than a value at which the stationary signal cannot be transmitted. Whether the position detecting signal should be transmitted may be determined based on both of the temperature in the tire 13 detected by the temperature sensor 33 and the voltage of the battery 37.

In the above illustrated embodiment, a capacitor may be provided that is connected in parallel to the transmission circuit 36. In that case, the capacitor stores electrical charge generated by charge of electricity from the battery 37. The electrical charge stored in the capacitor can be used to transmit the stationary signal. As in the above illustrated embodiment, a temperature in the tire 13 lower than the low temperature threshold can lower the voltage of the battery 37 to a level at which the stationary signal cannot be transmitted. In such a case, the capacitor stores electrical charge when the stationary signal is not being transmitted, and the stationary signal can be transmitted with the stored electrical charge.

The reception controller 51 may be configured to always obtain the RSSI.

When causing the reception controller 51 to obtain the RSSI, the stationary signal may be transmitted with data for instructing to start obtaining the RSSI. After the stationary signal containing the data for instructing to start obtaining the RSS is transmitted, a signal instructing to stop obtaining the RSSI may be transmitted, so that the RSSI is obtained for a predetermined time.

The vehicle 10 does not need to be a four-wheel vehicle, but may any type as long as it has two or more wheel assemblies 11.

In the illustrated embodiment, the rising edges and the falling edges of pulses are both counted. However, only the rising edges or the falling edges may be counted. In that case, the pulse count value would be half the number of the pulse count value in a case in which both the rising edges and the falling edges are counted.

The number of teeth of the gear may be changed. That is, the number of pulses that are generated by each of the rotation sensor units 21, 24 while the wheel assembly 11 is rotated one rotation.

The transmission threshold may be equal to the movement determination threshold. That is, the transmission of the stationary signal and the transmission of position detecting signal may be started simultaneously.

The stationary signal may contain data indicating the temperature in the tire 13.

As long as the positions of the wheel assemblies 11 can be identified, the number of times the rotational positions of the wheel assemblies at which the RSSI of the position detecting signal has the extreme values is obtained may be any number.

The transmission of the position detecting signal may be stopped by sending from a trigger device to the transmitter 31 a signal instructing to cancel stopping of the transmission.

DESCRIPTION OF THE REFERENCE NUMERALS

10 . . . Vehicle, 11 . . . Wheel Assemblies, 12 . . . Vehicle Wheels, 13 . . . Tire, 21 to 24 . . . Rotation Sensor Units, 30 . . . Tire Condition Monitoring Apparatus, 31 . . . Transmitter, 34 . . . Acceleration Sensor, 35 . . . Controller, 36 . . . Transmission Circuit, 50 . . . Receiver, 51 . . . Reception Controller, 52 . . . Reception Circuit

The invention claimed is:

1. A tire condition detecting apparatus that is provided in each of wheel assemblies of a vehicle to detect a condition of a tire, the apparatus comprising:
a condition detecting section, which detects the condition of the tire;
a transmission section, which is configured to transmit a signal that contains information related to the condition of the tire to a receiver, which includes a reception-side control section, wherein the reception-side control section identifies the position of the wheel assembly in which the tire condition detecting apparatus is provided based on a received signal strength indication (RSSI) of the signal; and
a transmission-side control section, which causes the transmission section to transmit the signal,
wherein the transmission-side control section is configured to cause a position detecting signal and an instruction signal to be transmitted from the transmission section to the receiver, wherein the position detecting signal is configured to cause the reception-side control section to identify the position of the tire condition detecting apparatus, and the instruction signal is transmitted before the position detecting signal is transmitted and instructs the reception-side control section to start obtaining the RSSI.

2. The tire condition detecting apparatus according to claim 1, wherein the instruction signal is a signal that specifies time during which the reception-side control section is caused to obtain the RSSI.

3. The tire condition detecting apparatus according to claim 2, further comprising an acceleration sensor, which detects acceleration in a direction in which centrifugal force acts as the wheel assembly rotates,
wherein the transmission-side control section varies the time during which the RSSI is obtained in accordance with the acceleration detected by the acceleration sensor.

4. The tire condition detecting apparatus according to claim 1, wherein the transmission-side control section causes a stop signal to be transmitted from the transmission section to the reception-side control section, the stop signal being configured to instruct to stop the obtainment of the RSSI.

5. A tire condition monitoring apparatus comprising:
a tire condition detecting apparatus; and
a receiver, which receives a signal transmitted from the tire condition detecting apparatus to obtain a condition of a tire, wherein
the tire condition detecting apparatus is provided in each of wheel assemblies of a vehicle to detect the condition of the tire,
the tire condition detecting apparatus includes
a condition detecting section, which detects the condition of the tire;
a transmission section, which is configured to transmit a signal that contains information related to the condition of the tire to a receiver, which includes a reception-side control section, wherein the reception-side control section identifies the position of the wheel assembly in which the tire condition detecting apparatus is provided based on a received signal strength indication (RSSI) of the signal, and
a transmission-side control section, which causes the transmission section to transmit the signal,
the transmission-side control section is configured to cause a position detecting signal and an instruction signal to be transmitted from the transmission section to the receiver, wherein the position detecting signal is configured to cause the reception-side control section to identify the position of the tire condition detecting apparatus, and the instruction signal is transmitted before the position detecting signal is transmitted and instructs the reception-side control section to start obtaining the RSSI, the receiver includes
- a receiving section, which receives the signal transmitted from the tire condition detecting apparatus, and
- a measuring section, which measures a received signal strength indication (RSSI) of the received signal, the reception-side control section obtains the RSSI measured by the measuring section and identifies, based on the obtained RSSI, the position of the wheel assembly in which the tire condition detecting apparatus that has transmitted the signal is provided, and the reception-side control section is configured to obtain the RSSI when receiving an instruction signal that instructs to obtain the RSSI.

\* \* \* \* \*